United States Patent [19]

Tomlinson et al.

[11] Patent Number: 4,730,765

[45] Date of Patent: Mar. 15, 1988

[54] METHOD OF BONDING BY USE OF A PHOSPHORUS CONTAINING COATING

[76] Inventors: Peter N. Tomlinson, 315 Enford Road, Mondeor, Johannesburg, Transvaal; Klaus Tank, 9 Warbleton Road, Essexwold, Johannesburg, Transvaal; Karl Schrittwieser, 104 Van Buuren Street, Bedfordview, Transvaal, all of South Africa

[21] Appl. No.: 805,201

[22] Filed: Dec. 4, 1985

[30] Foreign Application Priority Data

Dec. 6, 1984 [ZA] South Africa ............. 84/9506

[51] Int. Cl.$^4$ ............................. B23K 1/20
[52] U.S. Cl. ....................... 228/124; 76/DIG. 11
[58] Field of Search ............. 228/121, 124, 263.12; 427/376.7; 76/DIG. 11, DIG. 12

[56] References Cited

U.S. PATENT DOCUMENTS

| | | | |
|---|---|---|---|
| 2,872,312 | 2/1959 | Eisenberg | 427/376.7 X |
| 3,169,304 | 2/1965 | Gould | 228/124 X |
| 3,599,316 | 8/1971 | Moskal | 228/263.12 |
| 3,628,233 | 12/1971 | Sowko | 228/124 |
| 3,874,069 | 4/1975 | Ingleby | 228/124 |
| 4,203,690 | 5/1980 | Tanaka et al. | 76/DIG. 11 X |
| 4,352,714 | 10/1982 | Patterson et al. | 228/124 X |
| 4,520,881 | 6/1985 | Phaal | 228/263.12 X |

FOREIGN PATENT DOCUMENTS

| | | | |
|---|---|---|---|
| 72770 | 5/1982 | Japan | 228/124 |
| 90879 | 5/1985 | Japan | 228/263.12 |

*Primary Examiner*—Kenneth J. Ramsey
*Attorney, Agent, or Firm*—Curtis, Morris & Safford

[57] ABSTRACT

A method of bonding a cemented carbide surface to a metal surface is provided. The method involves applying an alloy layer to one or both of the surfaces, the alloy comprising a major amount of nickel or copper and a minor amount of phosphorus, heat treating the alloy layer below its liquidus temperature to cause it to diffusion bond to the surface top to which it is applied and bonding the surfaces together by means of a solder or braze alloy which preferably has a liquidus of no more than 750° C. The method has particular application to bonding cutting inserts to drill bits and cutting tools for mining machines.

11 Claims, No Drawings

METHOD OF BONDING BY USE OF A PHOSPHORUS CONTAINING COATING

BACKGROUND OF THE INVENTION

This invention relates to a bonding method and more particularly a method of bonding a cemented carbide surface to a metal surface.

Abrasive compacts are well known in the art and are used extensively in industry for the abrading of various workpieces. They consist essentially of a mass of abrasive particles present in an amount of at least 70 percent, preferably 80 to 90 percent, by volume of the compact bonded into a hard conglomerate. Compacts are polycrystalline masses having some direct particle-to-particle bonding. The abrasive particles of compacts are invariably superhard abrasives such as diamond and cubic boron nitride. Abrasive compacts are made under conditions of temperature and pressure at which the abrasive particle is crystallographically stable.

Abrasive compacts may be provided in a variety of forms such as circular discs, or segments thereof or fragments of other shapes.

Abrasive compacts may be bonded directly to a tool or shank for use. Alternatively, they may be bonded to a backing such as a cemented carbide backing which itself is bonded to the tool or shank. Abrasive compacts bonded to a cemented carbide backing are known in the art as "composite abrasive compacts".

Examples of abrasive compacts and composite abrasive compacts can be found in many patent specifications, for example British Patent Specification Nos. 1,489,130; 1,456,765 and 2,048,927 and U.S. Pat. Nos. 3,745,623; 3,743,489 and 4,224,380.

Composite abrasive compacts are used as cutting inserts for a variety of tools such as drill bits and mining picks. In many of these applications, it is necessary to bond the carbide backing firmly to the tool.

In other applications, the composite abrasive compact is bonded to a cemented carbide pin which is then located in a recess in the working surface of a drill bit and bonded thereto. One method which has been proposed for bonding the composite abrasive compact to the cemented carbide pin is described in European Patent Publication No. 0 090 657. This patent publication describes the bonding of the composite abrasive compact to a metal-containing substrate through a bonding layer comprising nickel, copper, cobalt, iron or an alloy containing one or more of these metals, bonding being achieved by means of solid state diffusion bonding. The metal-containing substrate is generally a cemented carbide substrate. It is to be noted that no working examples are provided of bonding a carbide surface to a metal surface.

SUMMARY OF THE INVENTION

According to the present invention, there is provided a method of bonding a cemented carbide surface to a metal surface including the steps of applying an alloy layer to one or both of the surfaces, the alloy comprising a major amount of nickel or copper and a minor amount of phosphorus, heat treating the alloy layer below its liquidus temperature to cause it to diffusion bond to the surface to which it is applied and bonding the surfaces together by means of a braze alloy. It has been found that the heat treatment causes the alloy layer to diffuse substantially into the surface to which it is applied.

DETAILED DESCRIPTION OF THE INVENTION

It has been found that the method of the invention produces a strong and effective bond between the cemented carbide surface and the metal surface. This is particularly so when the metal surface is a steel surface. It is preferred, particularly when the metal surface is a steel surface, that the alloy layer is applied only to the metal surface. The alloy on the heat treatment diffuses substantially into the surface to which it is applied. The thus treated surface, it has been found, bonds readily to the braze alloy.

The method of the invention has particular application to the bonding of composite abrasive compacts to metal surfaces, particularly steel surfaces. In such cases, it will be a carbide surface of the carbide support which will be bonded to the metal surface.

The metal surface may be provided by the working surface of a tool such as a drill bit or a cutting tool for a mining machine. Such cutting tools are described, for example, in U.S. Pat. No. 3,342,532. The composite abrasive compact may be located in a recess in the working surface and then bonded to that surface using the method of the invention.

One preferred alloy contains a major amount of nickel and 5 to 15 percent by weight of phosphorus. Generally this alloy will contain only the phosphorus and the nickel, with only trace amounts of other elements being present.

Another preferred alloy of the invention contains a major amount of copper and 3 to 10 percent by weight of phosphorus. The alloy will generally contain only the phosphorus and the copper, with only trace amounts of other elements being present. The alloy layer will be a thin layer and will generally not exceed 50 microns in thickness.

The heat treatment of the alloy layer is such as to cause it to diffusion bond to the surface to which it is applied. The heat treatment is preferably carried out at a temperature of 500° to 1200° C. for a period of 5 to 300 minutes. Preferably the heat treatment is carried out at a temperature within this range and for a period of 5 to 60 minutes. The heat treatment will generally take place in a vacuum, or a reducing or inert atmosphere.

The alloy is preferably formed on the surface by electrolessly or electrolytically plating nickel or copper thereon. In such a process the phosphorus reports in the nickel or copper coating thereby producing the alloy in situ.

Once the surface or surfaces have had the alloy layer diffusion bonded thereto, the surfaces are bonded together by means of a braze alloy. Examples of such braze alloys are those having a liquidus of no more than 750° C. and include soft solders having a liquidus in the range 140° to 400° C. such as those sold under the trade name Degussa Soldamol 280 and copper/tin/silver alloys. It is to be understood that in the specification, the term "braze alloy" includes soft solders. These low melting braze alloys generally do not to have the strengths of higher melting alloys. Surprisingly and notwithstanding this, it has been found that excellent bond strengths are achieved between the two surfaces. The braze alloys may also have liquidus temperatures above 750° C.

The surfaces may be bonded together by heating the braze alloy to its liquidus temperature by known means such as a braze torch or induction heating.

The invention will now be illustrated by means of the following examples.

EXAMPLE I

A steel drill bit had a plurality of shallow recesses formed in the working surface thereof. This bit had a nickel coating of the order of 20 microns in thickness electrolessly applied to it. The nickel coating formed a uniform coating over the surface of the drill bit. Incorporated in the nickel was about 8 weight percent of phosphorus. The coating was thus a nickel/phosphorus alloy.

The alloy coated drill bit was heat treated at a temperature of 930° C. for a period of one hour in an atmosphere of argon.

A plurality of composite diamond abrasive compacts each consisting of a diamond compact bonded to a cemented carbide support were manufactured using known techniques. Each composite compact was located in the working surface such that its carbide backing was accommodated in a recess. Provided between the carbide backing of each compact and the steel surface of the drill bit was the braze alloy Degussa 5009 having a liquidus temperature of 660° C. The drill crown was subjected to induction heating at a temperature slightly in excess of 660° C. causing the braze alloy to melt and bond to each surface. An excellent bond was achieved between the carbide supports and the steel surface of the drill bit and one which was stronger than could be achieved using the braze alloy alone.

EXAMPLE II

The procedure set out in Example I was followed except in this case a carbide insert was bonded to the steel working surface of a cutting tool (or pick) for a mining machine. A nickel/phosphorus alloy was applied electrolessly to the working end of the pick and heat treated in the manner set out in Example I. The carbide insert was then bonded to the pick using the Degussa 4003 braze alloy. Again, an excellent bond between the carbide tip and the steel surface of the cutting tool was obtained.

EXAMPLE III

A tungsten carbide cutting insert had a nickel/phosphorus alloy electrolessly applied to it in the manner set out in Example I. The coated insert was then heat treated in the manner set out in Example I. This insert was bonded to the steel surface of a cutting tool, also treated with a nickel/phosphorus alloy as set out in Example I, using a lead/tin/zinc soft solder having a liquidus of about 280° C. This soft solder generally produces a fairly weak bond. However, it was surprisingly found that a strong bond was achieved between the tungsten carbide insert and the steel surface of the cutting tool.

We claim:

1. A method of bonding a cemented carbide surface to a metal surface, including the steps of applying an alloy layer to one or both of the surfaces, the alloy comprising a major amount of nickel or copper and a minor amount of phosphorus, heat treating each said alloy layer at a temperature of from 500° to 1200° C. for a time of from 5 to 300 minutes, said temperature being below the liquidus of said alloy but sufficiently high that said heat treatment results in the alloy's diffusing substantially into the surface to which it is applied thereby to cause diffusion bonding between the surface and the alloy, and bonding the surfaces together by means of a solder or braze alloy.

2. A method according to claim 1 wherein the carbide surface is a carbide surface of a composite abrasive compact.

3. A method according to claim 1 wherein the metal surface is a steel surface.

4. A method according to claim 1 wherein the metal surface is a surface of a drill bit.

5. A method according to claim 1 wherein the metal surface is a surface of a cutting tool for a mining machine.

6. A method of claim 1 wherein the alloy layer has a thickness of less than 50 microns.

7. A method according to claim 1 wherein the alloy contains a major amount of nickel and 5 to 15 percent by weight of phosphorus.

8. A method according to claim 1 wherein the alloy contains a major amount of copper and 3 to 10 percent by weight of phosphorus.

9. A method according to claim 1 wherein the alloy coating is applied to the surface by electroless or electrolytic plating.

10. A method according to claim 1 wherein the heat treatment is carried out at a temperature in the range 500° to 1200° C. for a period of 5 to 60 minutes.

11. A method according to claim 1 wherein the solder or braze alloy has a liquidus of no more than 750° C.

* * * * *